Aug. 4, 1959 R. W. BERGSTROM ET AL 2,897,536
POULTRY BONING MACHINE
Filed April 4, 1958 5 Sheets-Sheet 1

INVENTORS
Ralph W. Bergstrom
BY Harold D. Lindeman
Fidler, Crouse & Beaverly
Attys.

Aug. 4, 1959

R. W. BERGSTROM ET AL 2,897,536

POULTRY BONING MACHINE

Filed April 4, 1958

INVENTORS
Ralph W. Bergstrom
BY Harold D. Lindeman
Fisher, Crouse & Beardsley
Att'ys.

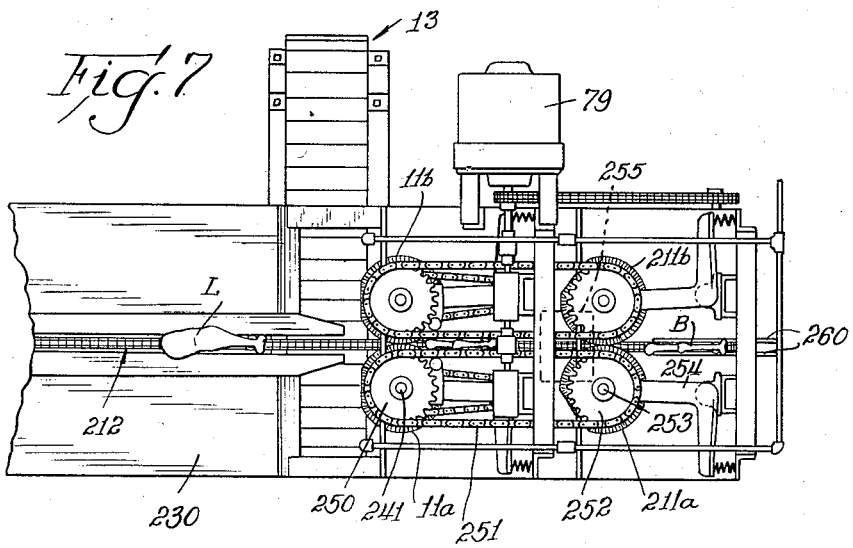
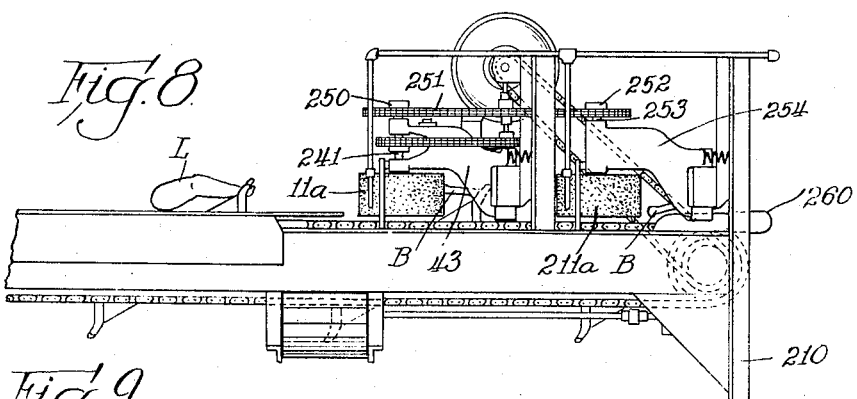
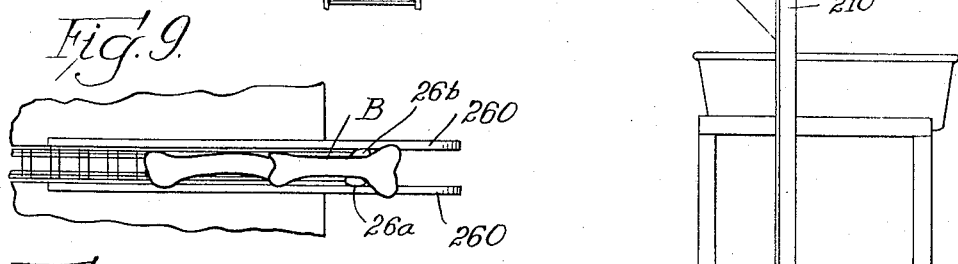
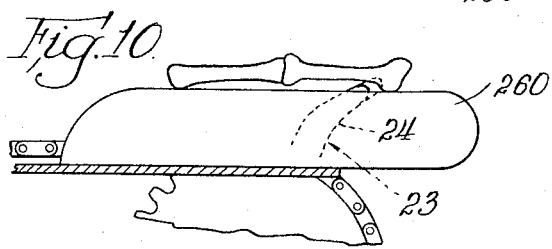

United States Patent Office 2,897,536
Patented Aug. 4, 1959

2,897,536

POULTRY BONING MACHINE

Ralph W. Bergstrom and Harold D. Lindeman, Worthington, Minn., assignors to Campbell Soup Company, Camden, N.J., a corporation of New Jersey Application April 4, 1958, Serial No. 726,460

12 Claims. (Cl. 17—1)

Our invention relates to poultry boning machines and has to do more particularly with machines for removing the meat from the leg bone of poultry.

This invention is an improvement upon the invention disclosed and claimed in our copending application Serial No. 482,956, filed January 20, 1955, now Patent No. 2,840,849, issued July 1, 1958, for Poultry Boning Machine.

For convenience in reference, the leg and attached thigh have been designated herein collectively as the "leg" and the corresponding leg bone and attached thigh bone as the "leg bone," although the portion of the poultry leg below the thigh is often alone referred to as the leg. Where such latter portion of the leg is meant it is referred to herein as the "lower leg." It is to be understood that while the machine disclosed herein is shown for illustrative purposes in connection with its use in removing the meat from the leg bone (including the lower leg bone and attached thigh bone), it is also suitable for removing the meat from the lower leg bone alone.

An object of the present invention is to provide an improved machine for removing the meat from a poultry leg bone.

Another object is to provide a poultry boning machine having improved means for transporting and guiding the leg between cooperating opposed rolls for stripping the meat from the bone.

A further object is to provide a poultry boning machine having improved means for yieldably urging into operative opposed relation a pair of stripping rolls adapted to strip the meat from a leg bone advanced past and between such rolls.

Still another object is to provide a poultry boning machine having opposed parallel stripping rolls so mounted that they are free to move apart to permit a poultry leg to pass therebetween, such movement being without any canting or binding of the rolls in their mounting and opposed only by yieldable means which normally urges the rolls toward each other.

A further object is to provide a poultry boning machine having opposed stripping rolls and novel mounting means therefor which permits the rolls to move apart to admit a poultry leg to pass therebetween and which yieldably urges the rolls toward each other and includes adjustable stop means for establishing the inner positions of the rolls.

Another object is to provide a poultry boning machine having novel conveyor means for transporting a succession of poultry legs past and between a pair of opposed stripping rolls which conveyor means permits easy attachment of the legs thereto and guides the legs in proper orientation into position between the stripping rolls.

A further object is to provide a poultry boning machine having conveyor means for moving a succession of poultry legs past and between opposed stripping rolls and wherein is provided means for positively and automatically removing from the conveyor means the leg bones after the meat has been stripped therefrom.

Still another object is to provide a poultry boning machine wherein the moving parts are so arranged and so enclosed that the operator is protected against injury.

Other objects and advantages of the invention will appear from the following description taken in connection with the appended drawings wherein:

Fig. 5 is a fragmentary, side elevational view taken along line 5—5 of Fig. 4;

Fig. 7 is a top plan view of a modified form of the machine of Fig. 1;

Fig. 8 is a side elevational view of the machine of Fig. 7;

Fig. 9 is a fragmentary, top plan view of a portion of the machine of Fig. 7 and showing particularly the bone ejector; and Fig. 10 is a side elevational view corresponding to Fig. 9.

The leg to be deboned is prepared by cooking, as explained in our aforementioned application Serial No. 482,956, whereby the leg is in condition for the removal of meat from the bones.

Figure 1:
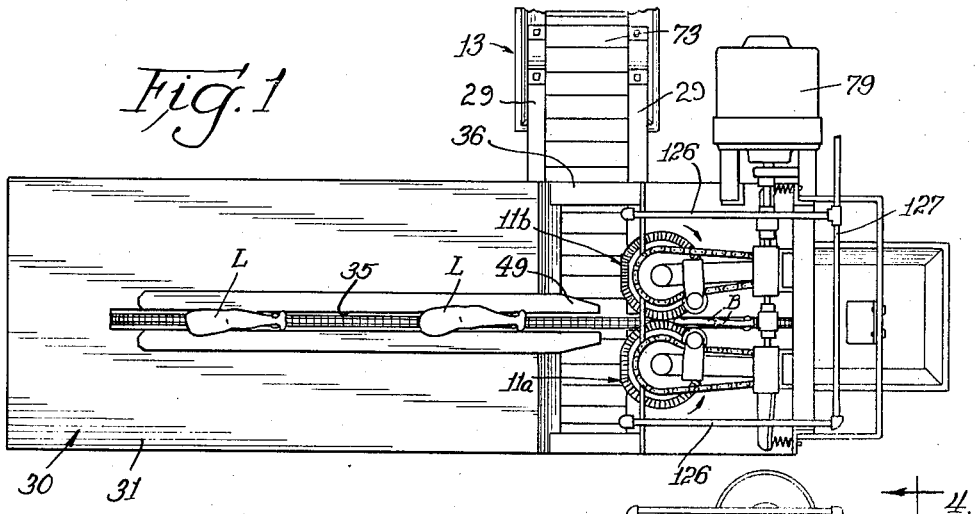
Figure 1 is a top plan and somewhat diagrammatic view of a machine constructed in accordance with our invention with portions of the casing removed to show the mechanism.
Figure 2:
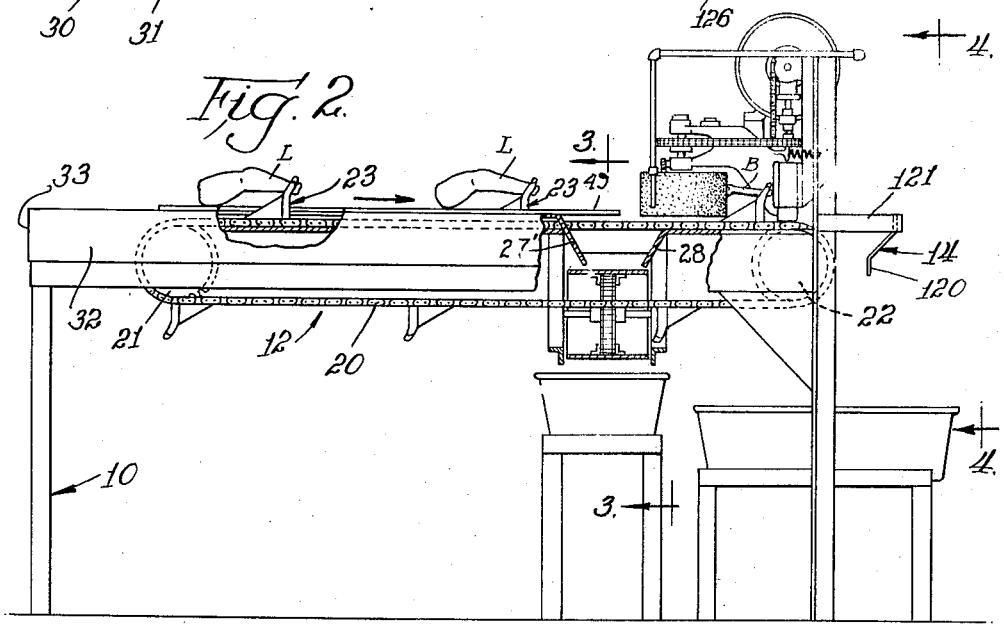
Fig. 2 is a side elevational and somewhat diagrammatic view, with parts broken away and in section, of the machine of Fig. 1.
Figure 3:
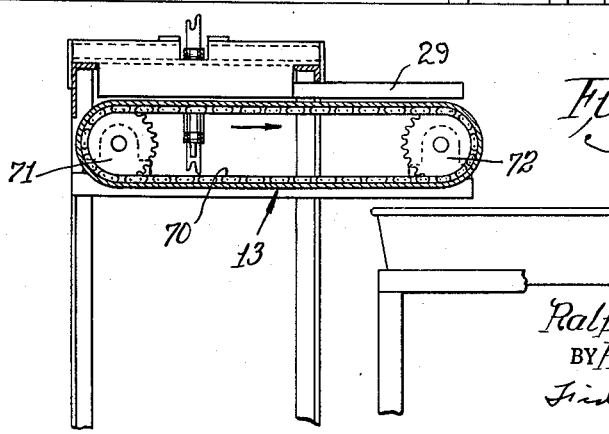
Fig. 3 is a reduced vertical sectional view taken along line 3—3 of Fig. 2.

Referring now particularly to Figs. 1 and 2, the machine of the present invention includes a supporting frame 10 which preferably is formed from suitably connected metal structural members such as channels, angle irons and straps. The frame serves to support the several operating portions or mechanisms of the machine hereinafter described, preferably at such height as to place such portions of the machine at suitable level for convenient manipulation by an operator. The operating mechanisms include principally a pair of opposed meat removing or stripping rolls 11a and 11b adapted to strip or pull the meat from the bones, a leg conveyor 12 for carrying the leg past and between the stripping rolls, a discharge conveyor 13 for receiving and carrying away to a point of collection or use the meat stripped from the bones, ejector means 14 for automatically removing the bones from the leg conveyor and drive means for driving the stripping rolls and conveyors.

The leg conveyor 12 includes an endless chain 20 trained over front and rear sprockets 21, 22. Carried on the endless chain 20 is a plurality of leg carriers 23 which are spaced apart a sufficient distance to permit convenient placing of a leg thereon and to prevent any interference between such member and a leg carried on an adjacent leg carrier. The spacing between carriers is such that only one leg is engaged at a time by the stripping rolls. Each leg carrier 23 (see especially Figs. 4 and 5) includes a hook 24 carried on a link of the chain 20 and including a shank 25 and a bifurcate head 26 having arms 26a and 26b with a leg-receiving notch 26c therebetween. In order to facilitate placing a leg in the hook, one of the arms 26b is made longer than the other which provides a guide to enable the operator to guide the leg onto the hook quickly and easily.

Secured rigidly to the hook 24 is a supporting element 27 which preferably takes the form of a plate extending rearwardly from the hook 24 and having a lower edge adapted to rest on the pins connecting the several links of the chain when the hook 24 is passing along the path of the upper flight of the chain 20. Since the supporting element 27 is not secured to the chain, there is no interference with the bending of the chain as it passes around the sprockets 21 and 22. The supporting element, however, does maintain the hook in upstanding position along the upper flight of the conveyor and thus maintains in proper position the leg L attached to the hook 24.

The leg conveyor 12 (Figs. 1 and 2) preferably is enclosed by a table 30 having a top 31, sides 32 and a front end 33 which serve to protect the operator. Extending longitudinally of the top 31 from a point spaced from the front (the left-hand side as viewed in Figs. 1 and 2) of the table is a narrow slot 35 arranged to permit the several leg carriers 23 to project therethrough and above the table top 31, to permit the placing of legs L on the respective leg carriers 23 as they pass along the slot 35. The table top also is provided with a wide, laterally extending side slot 36 or opening for a purpose hereinafter explained. The leg conveyor is driven, by means hereinafter described, to cause the upper flight to move the leg carriers from left to right (as viewed in Figs. 1 and 2).

Figure 6:
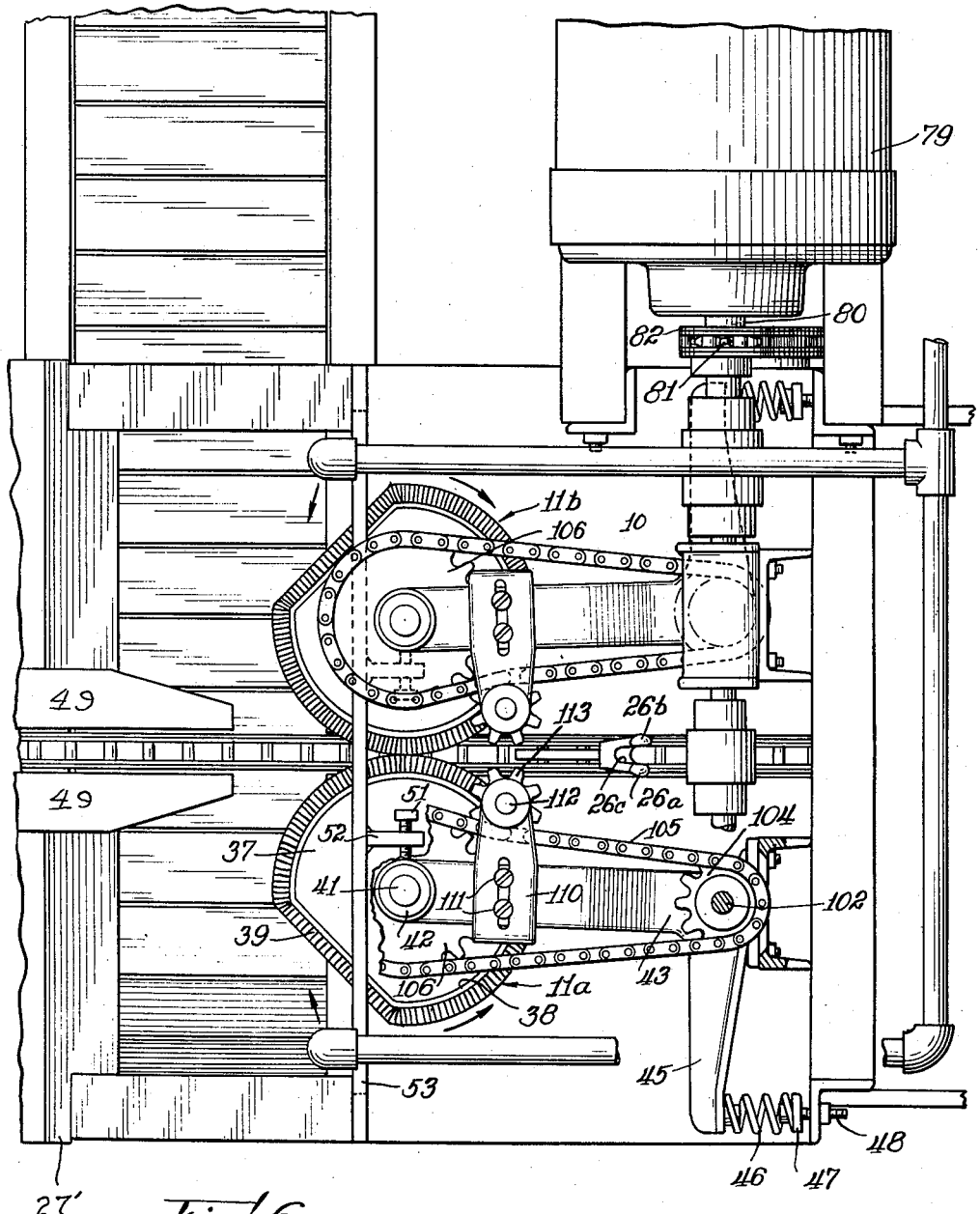
Fig. 6 is a fragmentary, top plan view taken along line 6—6 of Fig. 5.

The two stripping rolls 11a, 11b, are each formed similarly and are mounted and driven by similar means, except that the driving arrangements are such that the rolls are rotated in opposite directions, as indicated by arrows in Figs. 1 and 6. Consequently only one such roll and its mounting and driving arrangement will be described in detail herein, it being understood that the other roll is similar in its mounting and driving arrangement except as otherwise stated. The stripping rolls are so driven that the direction of movement of their peripheries at their opposed portions is opposite to the direction of movement of the upper flight of the leg conveyor 12. Each of the rolls 11a, 11b, is formed similarly to rolls disclosed in our copending application Serial No. 482,956, and reference is made to such prior application for a detailed disclosure of the rolls. Briefly, each of the rolls 11a and 11b (see especially Fig. 6) is formed by a solid rubber drum 37 of cylindrical form which carries in snug relation thereon an endless belt 38 provided with a plurality of fingers or studs 39.

Each of the rolls 11a and 11b is provided with a portion of its periphery formed chordally or "flatted," as seen particularly in Figs. 1 and 6, which is accomplished by providing each of the solid rubber drums 37 forming a portion of the rolls with a flatted portion whereby the corresponding belt 38 carried on the drum and having the fingers 39 assumes the shape of a cylinder with a flatted portion at one portion of its periphery. The rolls 11a and 11b are so mounted (as hereinafter described more in detail) that the two flatted portions are disposed in opposition or facing arrangement upon suitable rotation of the rolls to a position wherein the flatted portions are parallel to a vertical plane through the center line of the conveyor 12. The flatted portions of each of the rolls 11a and 11b are of such extent that when they are in opposing relation there is sufficient space between the rolls for the leg carrier 23 and the leg L to pass freely into the space between the rolls. This permits the leg L to be moved into position between the two rolls and without any interference, whereafter upon further rotation of the rolls, the circular, peripheral portions of the rolls are positioned with their peripheries substantially tangential, to grip the meat and strip it from the rolls in a manner explained more in detail in our aforesaid application Serial No. 482,956.

The stripping rolls 11a, 11b, are mounted for rotation about parallel, vertical axes in the same vertical plane extending perpendicularly to the line of movement of the conveyor 12. As explained more in detail in our prior, copending application, the stripping rolls 11a and 11b are mounted so that the distance between centers of the rolls is equal to approximately twice the radius of each roll at its larger diameter. In other words, the rolls are so mounted that when in their normal, innermost position, the extreme ends of the fingers or studs (not shown in detail) are in substantially tangential relation except when the flattened portions of the rolls are in opposed relation. In this connection, it will be noted that the rolls 12a and 12b are mounted so that when in their innermost positions (their positions of closest approach) the ends of the fingers or studs on the rolls (not shown in detail) are preferably in contact and do not press against or distort the fingers of the opposing roll.

The roll 11a is rotatably carried by a shaft 41 (see Figs. 5 and 6) journalled in bearings 42 carried in an arm 43 which is pivotally mounted for swinging movement on the frame 10 in a manner hereinafter explained. Extending horizontally from the arm 43 and at right angles thereto is an arm 45, and a spring 46 is compressed between the end of the arm 45 and a seat 47 adjustably secured in the frame 10 as by a screw 48. Thus the arm 43 is yieldably urged in a direction to move the stripping roll 11a toward the opposed stripping roll 11b. The compression of the spring 46 may be adjusted by adjusting the position of the seat 47 relatively to the frame.

An adjustable stop for each roll 11a and 11b is provided, which stop preferably takes the form of a screw 51 threaded into an arm 52 carried on a bridge 53 secured on the frame 10 and extending over the roll 11a. The adjustable stops 50 limit the movement of the rolls toward each other and preferably the two stops each are so adjusted that the rolls are halted at innermost positions wherein they are tangent along a vertical plane extending medially of the conveyor 10.

The discharge conveyor 13 (see especially Figs. 1 and 2) is disposed in position below the wide slot 40 and under the forward portions of the rolls 11a and 11b and located so as to receive by gravity the meat which is stripped from the bones. This conveyor is of substantial width and is of a type adapted to receive the meat stripped from the bones and prevent it from dropping from the conveyor except at the discharge end. Accordingly, the conveyor 13 includes an endless member such as a chain 70 trained around sprockets 71, 72, journalled in the frame 10. The chain 70 carries a plurality of transversely extending plates 73 each of which is individually attached to the chain and which are linked together supported so that in their upper flight position they form a substantially continuous floor, the spaces being so slight between adjacent plates as to prevent meat from falling down through such spaces.

The discharge conveyor 13 extends under and laterally to one side of the leg conveyor 12 a sufficient distance to a point of utilization of the meat, or collection in a receptacle, as indicated in Fig. 5, for example.

It will be noted that the upper flight of the discharge conveyor 13 is placed closely under the upper flight of the leg conveyor 12 and passes between the two flights of the latter, with the lower flight of the discharge conveyor being disposed under the lower flight of the leg conveyor. The distance between the two flights of the discharge conveyor therefor is made sufficient in order to permit the lower flight of the leg conveyor and the attached leg carriers to pass between the flights of the discharge conveyor.

Depending from the top 31 of the table 30 (Figs. 1 and 2) is a rear end wall 27' which preferably is inclined and which extends from the table top to just above the upper flight of the discharge conveyor 13. This end wall thus serves to guide onto the discharge conveyor the meat which is removed by the stripping rolls and which is projected forwardly thereby and falls by gravity toward the discharge conveyor. A generally similar wall member 28 is provided below the stripping rolls for directing onto the conveyor any meat which falls from between the rolls. Guard rails 29 preferably are provided on both sides of that portion of the discharge conveyor 13 which projects laterally in order to prevent the meat from falling off the conveyor. Means are provided for supporting and guiding the legs on the carriers 23 into the nip of the stripping rolls. Such means includes a pair of guide strips 49 secured to the table top 31 and extending along both sides of the slot 35. The guide strips extend over the discharge conveyor 13, as seen in Figs. 1, 2 and 5, to close to the rolls 11a and 11b and support the legs until they pass between and are gripped by the rolls. The projecting portions of the guide strips are so arranged, however, that they do not prevent the meat which is removed from the bones by the rolls from dropping onto the conveyor for removal to a point of utilization or collection.

The several mechanisms hereabove described preferably are driven from a single source of power although separate sources may be provided. It is essential, however, that the movement of the leg conveyor 12 and the stripping rolls 11a and 11b be synchronized so that each leg enters between the stripping rolls at the time when the flatted portions are in opposed, facing, and spaced relation.

The drive includes a motor 79 (see especially Figs. 5 and 6) supported on the frame 10 and driving a main drive shaft 80 carrying a sprocket 81 over which is trained a main drive chain 82 which drives a sprocket 83 fixed on a second shaft 84 (see Fig. 4) journalled in the frame, on which latter shaft is carried the rear sprocket 22 of the leg conveyor 12, whereby the latter is driven.

Also fixed on the shaft 84 is a sprocket 90 over which is trained a chain 91 which is trained around a sprocket 92 fixed on a shaft 93 which carries a bevel gear 94 meshing with a second bevel gear 95 fixed on a shaft 96 which carries the drive sprocket 71 of the discharge conveyor 13.

Fixed on the main drive shaft 80 are bevel gears 100 each driving a bevel gear 101 carried on a vertical shaft 102 and journalled in a bearing 103 fixed on the frame, each of which shafts carries a sprocket 104 around which is trained a chain 105 which is trained around a sprocket 106 secured on the shaft 41 which carries the corresponding stripping roll. An adjustable chain take-up means is provided for each of the chains 105 which includes a bracket 110 adjustably secured on the arm 43 as by screws 111, a shaft 112 journalled in the bracket 110 and an idler sprocket 113 carried on such shaft and engaging the chain 105. The shaft 102 and the bearing 103 above-mentioned serve to support the arm 43 pivotally on the frame for swinging movement in a horizontal plane.

Ejector means 14 are provided for automatically insuring the removal of the bones B from the hooks 26 after they have passed between the rolls. While the bones may drop by gravity from the hooks when the hooks are inverted when they pass around the rear sprocket 22 and along the path of the lower flight of the chain 20, it is desired to provide positive ejector means in order to insure that the bones are removed. To this end a flexible plate 120 (Figs. 1 and 2) formed preferably of spring metal is supported by a bracket 121 in a position rearwardly beyond and slightly below the rear end of the upper flight of the leg conveyor 12. When the stripped bone is carried in a path around the rear sprocket 22 it presses against the spring plate 120 and causes the same to be bent slightly in a rearward direction. This places a bending stress on the bone in the hook and thus when the bone clears the spring plate the stress thereon is relieved and the bone is flipped off the hook and falls by gravity and may be collected in a collection receptacle, as shown particularly in Figs. 1 and 2 of the drawings. It will be seen that the bone is tensioned by the flexible plate 120 only so long as it is in contact therewith and the release of such tension serves to free the bone of the hook.

Means are provided for cleaning the rolls 11a and 11b which, as will be apparent, receive between the fingers 39 thereof small pieces of meat which are removed from the leg bone and which pieces tend to collect in the spaces between the fingers. It is important to remove these small pieces of meat between the studs in order that the fingers may effectively perform their stripping function. Accordingly, we provide a pair of air nozzles 125, 125 (Figs. 2 and 5), which are connected respectively to conduits 126, 126, which in turn are connected to a header 127 connected to a suitable source (not shown) of air under suitable pressure. Each nozzle 125 is positioned so as to direct jets of air generally tangentially of the periphery of the corresponding roll but impinging upon the roll and in a direction parallel to and along the spaces between adjacent rows of fingers so as to pass along each of the spaces as the roll is rotated past the jet of air issuing from the corresponding nozzle 125.

The stripping rolls and drive mechanism preferably are enclosed in a cabinet or casing (not shown) in order to protect the operator, which casing may be of any suitable form which permits passage of the leg carriers therethrough. Such cabinet includes preferably the top wall, two side walls, a rear end wall and a front end wall (not shown), which latter extends down sufficiently to protect the operator from getting his hands caught in the rolls but permitting the passage of the leg carriers into the cabinet and past and beyond the stripping rolls.

The machine is placed in operation by energizing the motor 79 which, operating through the several elements of the drive above described, drives the leg conveyor 12, the stripping rolls 11a and 11b and the discharge conveyor 13.

The leg L, after having been prepared as above described, is placed on one of the leg carriers as the latter passes that portion of its travel wherein it projects above the table top 31. The leg is disposed on the hook by placing it in the notch 26c with the knuckle (hock) portion against the arms 26a and 26b. The leg thus rests upon and is supported by the leg carrier 23 and the upper surface of the guide 49, as indicated somewhat diagrammatically in the drawings (see Fig. 2).

The leg conveyor 12 advances the leg L along the table and into the space between the rolls 11a and 11b which at the time the carrier 26 passes between the rolls is provided by the positions of the flatted portions of the rolls in face-to-face opposition to provide a space sufficient to permit the leg hook and knuckle of the leg bone to pass therebetween without interfering with the operation of the stripping rolls or causing any damage to the fingers of the rolls. The timing is such that the leg hooks and the knuckle of the leg bone clear the roll before the circular peripheral portions of the rolls move into tangency, all as disclosed in our prior application Serial No. 482,956.

Figure 4:
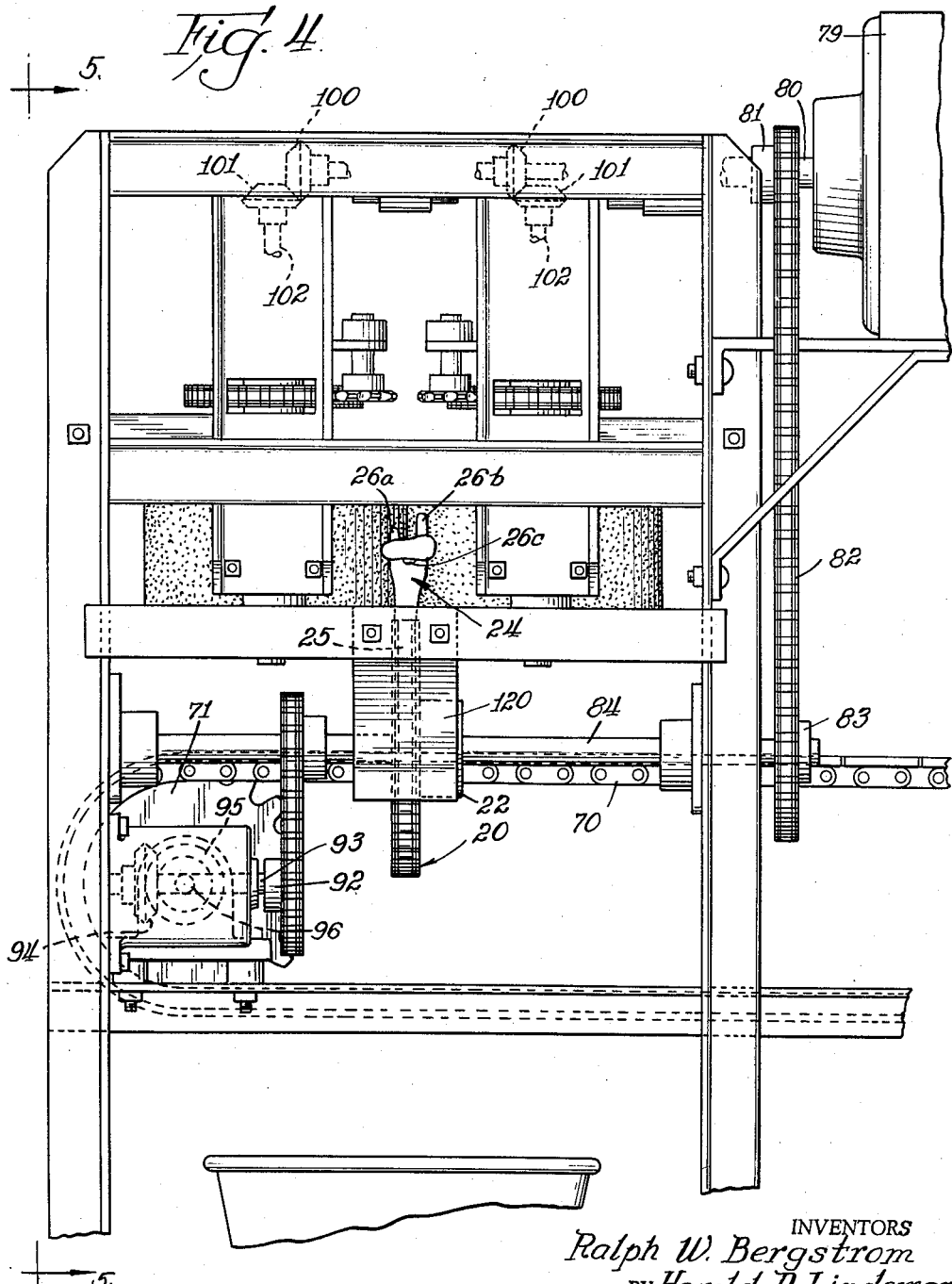
Fig. 4 is an enlarged, fragmentary, rear elevational view taken along the line 4—4 of Fig. 2.

The stripping rolls 11a and 11b are rotated in opposite directions, as indicated by arrows in Figs. 4 and 7 of the drawings, whereby the two inner, opposed portions move apart and the circular portions of the peripheries move substantially into tangency. The stripping rolls are so dimensioned in respect to each other and to the leg conveyor that as soon as the leg hook has cleared the stripping rolls the peripheries of the latter come together and grippingly engage beneath at a point just below the hock or knuckle. Owing to the fact that the legs are being moved in one direction with the leg conveyor and at the same time the peripheries of the stripping rolls are moving in opposite directions therefrom, the stripping rolls grip the meat and pull it relatively to the bone so that the meat is stripped or pulled off the bone with a minimum of injury to or fragmentation of the meat. The fingers and the belt are sufficiently soft and pliable so that where they are in opposition and against the meat they bend sufficiently so that the meat is not damaged by the compressive forces exerted on it by the stripping rolls. On the other hand, sufficient resistance to separation of the opposing portions of the rolls is afforded to maintain a firm stripping pressure on the meat. The stripping rolls 11a and 11b are yieldably urged inwardly as above described toward their inner position being halted by the adjustable stops. Thus, the stripping rolls are free to move outwardly and apart, when they encounter any substantial resistance, as for example, the meat adhering to the bone and joint of the bone so as to accommodate the same without damaging the fingers.

The meat stripping action being in a direction away from the hock and toward the larger end of the leg, there is no tendency to remove or break the needle-like bony members which are attached to the leg bone, nor to strip off the gristle which covers the joint between the lower leg bone and the thigh bone. The meat is completely removed from the bone and falls free of the stripping rolls and on to the discharge conveyor by which it is conveyed to a point of use or collection.

The bones (including the lower leg bone and attached thigh bone) are carried past and between and eventually clear the stripping rolls, and as they pass around the path of the leg conveyor in traveling from the upper flight to its lower flight bear against the flexible plate 120 of the ejector 14 and tension the latter which stresses the lower leg bone and bends it inwardly toward the shank of the hook so that when the bone clears the spring arm it is flipped from the hook and falls by gravity away from the hook. The bones may be collected in a suitable receptacle disposed under the ejector 14.

The drive is so designed and the motor is operated at such speed as to provide a lineal speed of the leg of from appromixately 39 feet per minute (f.p.m.) to approximately 105 f.p.m. and peripheral surface speed of the fingers of approximately 37 f.p.m. to approximately 100 f.p.m. Thus the relative lineal speeds of the leg hook and the rolls range from approximately 76 f.p.m. to 205 f.p.m.

At this point it should be noted that the leg conveyor may be operated at a greater speed than set forth above, but that it is desirable to maintain the relative speeds of the leg hook and the roll surfaces within the limits indicated. Therefore, where the leg conveyor is operated at a greater speed than above mentioned, the rolls are operated at a correspondingly slower surface speed.

It will be seen from the foregoing that the machine of the present invention has all of the advantages set forth in our copending application Serial No. 482,956 in connection with the machine disclosed in that application and many additional advantages.

Certain modifications may be made in the machine shown in Figs. 1 to 6 and as illustrated particularly in the embodiment shown in Figs. 7 to 10. In the embodiment of the machine illustrated in Figs. 7 to 8, all of the members which are similar to the corresponding members of the machine shown in Figs. 1 to 6, inclusive, and are designated by similar reference characters.

One change over the first embodiment is the provision of an additional set of stripping rolls disposed in line with and rearwardly of the stripping rolls above described, which second set of rolls serves to remove from the bone any particles of the meat which may adhere thereto after the meat has passed through the first set of rolls. The second set of rolls, which may be called the "polishing" rolls preferably are identical with the first set of rolls and are mounted in a similar manner. Referring now to Figs. 7 and 8 a pair of polishing rolls 211a and 211b are shown which are disposed rearwardly of and in alignment with the principal stripping rolls 11a and 11b.

In order to accommodate the added stripping rolls, the frame 210 of the machine extends rearwardly a greater distance than the frame 10 of the first embodiment and the leg conveyor 212 is correspondingly longer than the conveyor 12.

The polishing rolls 211a and 211b are mounted on the frame in a manner similar to that in which the principal stripping rolls 11a and 11b are mounted and are operated in a similar manner. The two polishing rolls 211a and 211b are driven by similar drive mechanism, only one of which will be described. Such drive mechanism includes a sprocket 250 secured on the shaft 241 which carries the principal stripping roll 11a, and which sprocket is located above the upper bearing of the arm 43 in which the shaft 241 is journalled. The sprocket 250 drives a chain 251 which is trained around a sprocket 252 carried on a shaft 253 which shaft carries the polishing roll 211a and is journalled in an arm 254 generally similar to and supported in a manner similar to the arm 43.

From the foregoing it will be seen that the embodiment shown in Figs. 7 and 8 operates in the same manner as the machine shown in Figs. 1 to 6, but with the additional meat removing action provided by the polishing rolls. The leg is advanced between the principal stripping rolls 11a and 11b and the meat removed in the same manner as in the first embodiment. The bones are then carried past and between the polishing rolls and subjected to a further stripping action which removes any particles of meat that were not removed by the passage of the leg through the first set of rolls and which still adhere to the bone. Such removed particles fall by gravity through an opening 255 provided in the top of the table 230.

A modified form of bone ejector is provided in the embodiment shown in Figs. 7–10 but also which may be substituted in the first embodiment for the bone ejector disclosed in connection therewith. The modified form of bone ejector includes a pair of parallel rails 260 which are supported on and extend along opposite sides of the path of travel of the leg carriers 23 from a point behind the rearmost stripping rolls 211a and 211b to a point extending horizontally beyond the rear end of the endless conveyor 212. The rails 260 are located along the side edges of the slot in the table top and are spaced apart a distance just sufficient to permit the passage of the leg carriers 23 therebetween, and are of such height that their upper edges engage the knuckle of the bone B on each carrier 23 during the passage of the carrier along the portion of its path between the rails 260. Thus, when the leg carrier moves downwardly around the rear sprocket 22 of the endless conveyor the bone is restrained against downward movement by the rails 260 and is thereby moved out of engagement with the hook 24. The position of the ends of the rails 260 is such that the bone is removed from the hook just as it reaches the end of the rails 260 so that as the hook passes rearwardly and downwardly beyond the ends of the rails 260 the bone falls free from both the hook and the rails.

All of the principal members of the machine which come in contact with the meat with the exception of the drums and belts which constitute the stripping rolls as, for example, the leg carriers, the discharge conveyor plates, the table top and the collection receptacles preferably are formed from a material which is inert to the meat and which is not stained or corroded and for this purpose we prefer to use stainless steel.

We claim:

1. A poultry boning machine comprising a support, a pair of stripping rolls, means mounting said rolls in opposition on said support for rotation about spaced, parallel axes, means connected to said rolls for rotating them in opposite directions, means on said support for conveying poultry legs past and between said rolls including an endless conveyor element, a plurality of leg carrying hooks secured in spaced relation on said conveyor element, and means for driving said conveyor element, and a guide extending along said conveyor element for guiding into the nip of said rolls legs carried on said hooks.

2. A poultry boning machine comprising a support, a pair of stripping rolls, means mounting said rolls on said support for rotation about spaced, parallel, vertical axes, means connected to said rolls for rotating them in opposite directions, means on said support for conveying poultry legs along a horizontal path past and between said rolls including an endless conveyor element having an upper flight extending horizontally past and under said rolls, a plurality of leg carrying hooks secured in spaced relation on said conveyor element and means for driving said conveyor element, and a guide extending along said conveyor element for guiding into the nip of said rolls legs carried on said hooks.

3. A poultry boning machine comprising a support, a pair of stripping rolls, means mounting said rolls in opposition on said support for rotation about spaced parallel axes, means connected to said rolls for rotating them in opposite directions, means on said support for conveying poultry legs past and between said rolls including an endless chain, a plurality of carriers secured in spaced relation on said conveyor element each including a hook carried by a link of said chain and a supporting element rigid with an extending rearwardly of said hook and positioned to rest on said chain when said carrier is moved along the path of the upper flight of the chain to support the hook in upright position, and means for driving said conveyor element, and a guide extending along said conveyor element for guiding into the nip of said rolls legs carried on said hooks.

4. A poultry boning machine comprising a support, a pair of stripping rolls, means mounting said rolls in opposition on said support for rotation about spaced parallel axes, means connected to said rolls for rotating them in opposite directions, means on said support for conveying poultry legs past and between said rolls including an endless conveyor element, a plurality of leg carrying hooks secured in spaced relation on said conveyor element and means for driving said conveyor element, a guide extending along said conveyor element for guiding into the nip of said rolls legs carried on said hooks, and ejector means on said support and adjacent the path of movement of said hooks beyond said rolls for removing the bones from said hooks after the latter have passed between said rolls.

5. The invention as set forth in claim 4 wherein said ejector means includes a member on said support adjacent the path of said hooks and positioned to engage the bones on said hooks as the latter pass said ejector.

6. The invention as set forth in claim 4 wherein said ejector means includes a resilient member disposed in the path of movement of the bones on said hooks and positioned to apply a bending stress on each of said bones as the corresponding hook passes said ejector, whereby when the bone clears the ejector, the bone is flipped out of each hook.

7. The invention as set forth in claim 4 wherein said conveyor is disposed generally horizontally and said ejector means includes a pair of rails extending along the path of movement of said hooks on opposite sides thereof and both adjacent and beyond the end of the upper flight of said conveyor and disposed in position to engage the knuckles of bones in said hooks to remove the bones from said hooks as the latter pass from the upper to the lower flight of the conveyor.

8. A poultry boning machine comprising a support, a pair of stripping rolls, means mounting said rolls on said support for rotation about spaced parallel axes and for movement toward and away from each other, means for yieldably resisting separating movement of said rolls, adjustable stop means for establishing a limit of movement of said rolls toward each other, means connected to said rolls for driving said rolls, and means on said support for conveying poultry legs past and between said rolls.

9. A poultry boning machine comprising a support, a pair of stripping rolls, means mounting said rolls on said support for rotation about spaced parallel axes and for movement toward and away from each other, including arms swingably mounted on said support, spring means acting on said arms for yieldably resisting separating movement of said rolls, adjustable stop means for establishing a limit of movement of said rolls toward each other, means connected to said rolls for driving said rolls, and means on said support for conveying poultry legs past and between said rolls.

10. A poultry boning machine comprising a support, a pair of stripping rolls, means mounting said rolls on said support for rotation about spaced parallel axes and including means supporting said rolls for movement toward and away from each other, means for yieldably resisting separating movement of said rolls, means connected to said rolls for driving said rolls, and means on said support for conveying poultry legs past and between said rolls, adjustable stop means for establishing a limit of movement of said rolls toward each other in a position wherein the peripheries of said rolls are tangent to each other in a plane extending through the longitudinal center line of the path of movement of the poultry legs between said rolls.

11. A poultry boning machine comprising a support, two pair of stripping rolls, means mounting each pair of said rolls in opposition on said support for rotation about spaced parallel, vertical axes with their peripheries substantially tangent to each other, means connected to said pairs of rolls for rotating the rolls of each pair in opposite directions, and corresponding rolls of different pairs in the same direction, means on said support for conveying poultry legs past and between both pairs of rolls successively, including an endless conveyor element, a plurality of leg carrying hooks secured in spaced relation on said conveyor element, and means for driving said conveyor, and a guide extending along said conveyor element for guiding into the nip of both pairs of rolls legs carried by said hooks.

12. A poultry boning machine comprising a support, a pair of stripping rolls, means mounting said rolls on said support for rotation about spaced parallel axes, means connected to said rolls for rotating them in opposite directions, a first conveyor on said support for conveying poultry legs past and between said rolls; a second conveyor extending transversely of said first conveyor below said first conveyor and in a position under and ahead of said rolls to receive the meat removed by said rolls from poultry legs carried therethrough by said first conveyor, means for driving said conveyors and a guide extending along said first conveyor and over said second conveyor for guiding into the nip of the rolls legs carried on said hooks.

No references cited.